(12) United States Patent
Tanaka

(10) Patent No.: US 6,473,796 B2
(45) Date of Patent: Oct. 29, 2002

(54) IMAGE PROCESSING SYSTEM, APPARATUS AND METHOD IN A CLIENT/SERVER ENVIRONMENT FOR CLIENT AUTHORIZATION CONTROLLED-BASED VIEWING OF IMAGE SENSED CONDITIONS FROM A CAMERA

(75) Inventor: Kenichiro Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/162,029

(22) Filed: Sep. 28, 1998

(65) Prior Publication Data

US 2002/0103894 A1 Aug. 1, 2002

(30) Foreign Application Priority Data

Sep. 30, 1997 (JP) ............................................. 9-267370

(51) Int. Cl.$^7$ ............................................. G06F 15/173
(52) U.S. Cl. ........................ 709/224; 709/203; 709/225; 348/46; 725/12
(58) Field of Search ................................. 709/102, 201, 709/203, 217, 218, 223, 224, 225, 229, 231, 232; 348/46, 49, 53; 725/12

(56) References Cited

U.S. PATENT DOCUMENTS

| | | | | |
|---|---|---|---|---|
| 5,909,548 A | * | 6/1999 | Klein et al. ................... | 709/217 |
| 6,008,837 A | * | 12/1999 | Yonezawa ..................... | 348/15 |
| 6,044,218 A | * | 3/2000 | Faustini ......................... | 717/2 |
| 6,067,571 A | * | 5/2000 | Igarashi et al. .............. | 709/232 |
| 6,122,005 A | * | 9/2000 | Sasaki et al. ................ | 348/211 |

OTHER PUBLICATIONS

VideoMap and VideoSpaceIcon: tools for anatomizing content, Tonomura, Y.; Akusu A.; Otsuji, K.; Sadakata T.; SIGCHI ACM Special Interest Group on Computer–Human Interaction, ISBN: 0–89791–575–5, 1993 pp. 131–136.*

Image composition system capable of long–range camera movement, Hayashi,M.; Fukui, K.; Itoh, Y.; SIGCHI: ACM Special Interest Group on Management Information systems, ISBN: 0–89791–871–1, 1997 pp. 153–161.*

Panorama Excerpts: extracting and packing panormas for video browsing, Taniguchi, Y.; Akutsu, A.; Tonomura, Y., SIGCHI: ACM Special Interest Group on Hypertext, Hypermedia, and Web, ISBN: 0–89791–991–2, 1997 pp. 427–436.*

Tilting operations for small screen interfaces, Rekimoto, J., SIGCHI: ACM Special Interest Group on Computer Graphics and Interactive Tecniques, ISBN: 0–89791–798–7, 1996 pp. 167–168.*

* cited by examiner

*Primary Examiner*—Mehmet B. Geckil
*Assistant Examiner*—Beatriz Prieto
(74) *Attorney, Agent, or Firm*—Morgan & Finnegan, L.L.P.

(57) ABSTRACT

When a client control apparatus 108 on a network connects to a camera control apparatus 102 in hyper text transfer protocol and requests the camera control apparatus 102 to transmit a file of its home page, the camera control apparatus 102 transmits a file, to the client control apparatus 108, including a description for causing the client control apparatus 108 to request the camera control apparatus 102 to transmit an applet for performing automatic reception. When the client control apparatus 108 receives this file, transmission of the applet is requested, and the server control apparatus 102 transmits the applet. Then, when transmission of state information is requested, the server control apparatus 102 transmits state information to the client control apparatus 108 only when an event indicative of a change in an angle of a camera occurs; thereby traffic of the network is reduced.

18 Claims, 5 Drawing Sheets

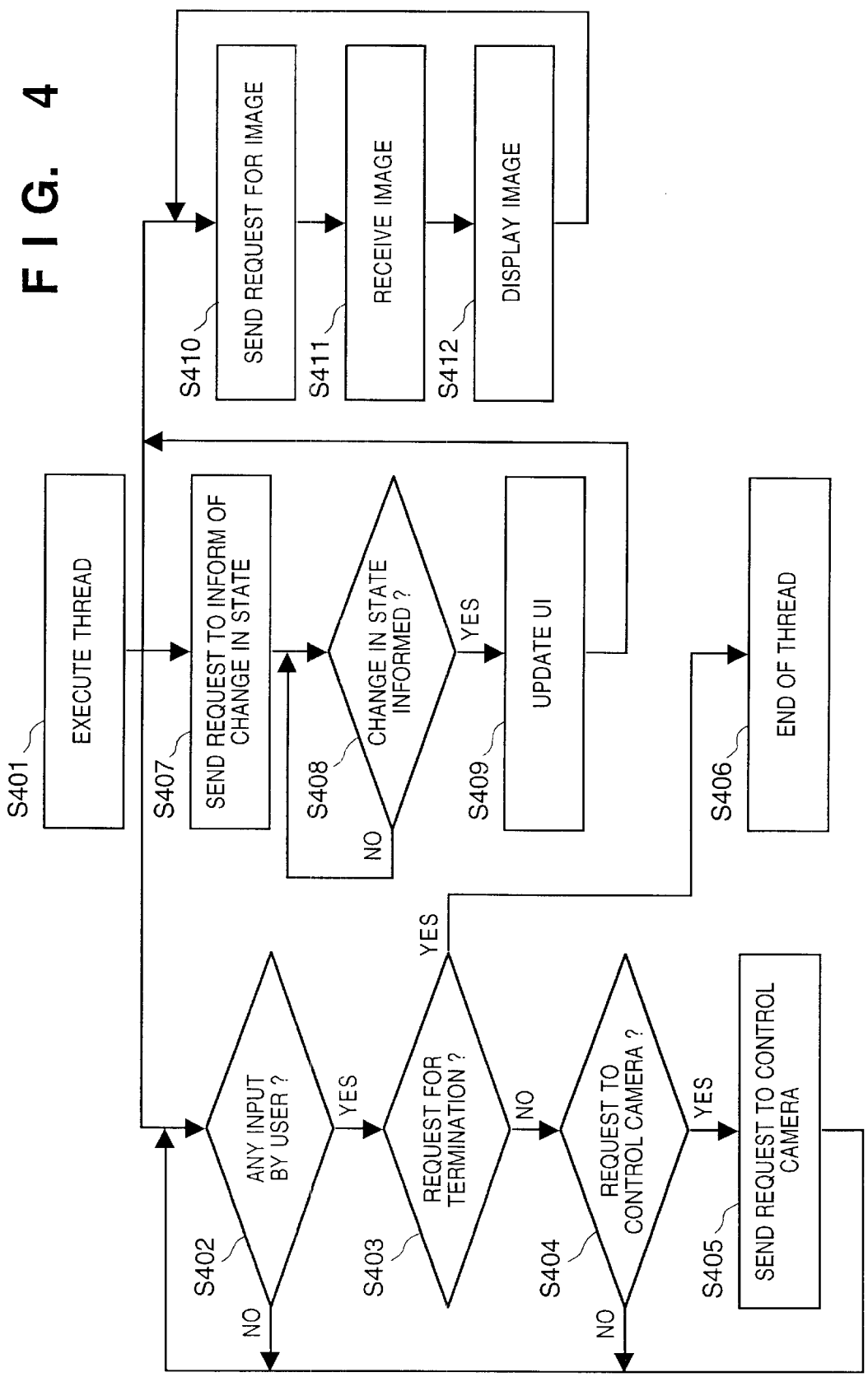

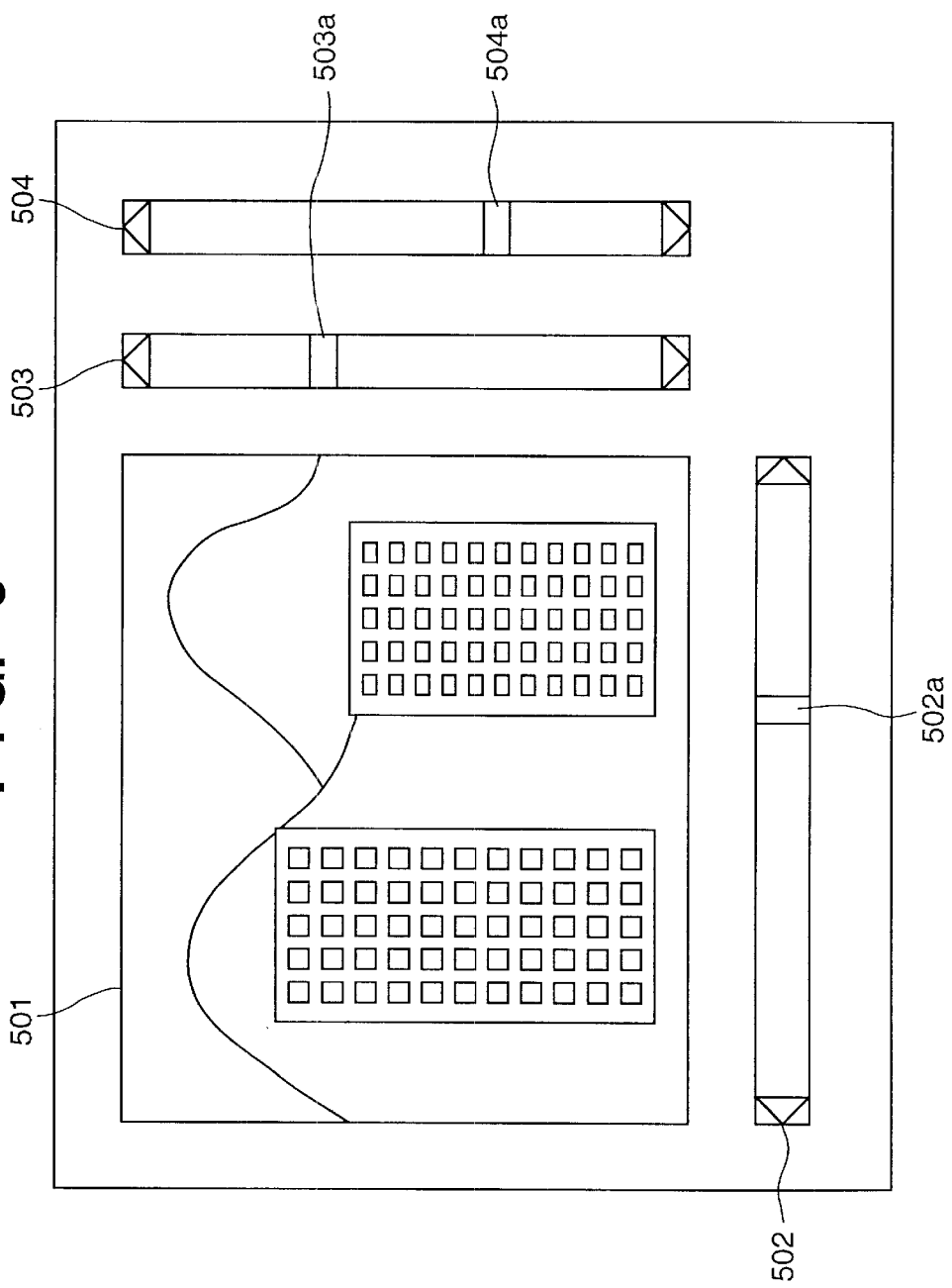

IMAGE PROCESSING SYSTEM, APPARATUS AND METHOD IN A CLIENT/SERVER ENVIRONMENT FOR CLIENT AUTHORIZATION CONTROLLED-BASED VIEWING OF IMAGE SENSED CONDITIONS FROM A CAMERA

BACKGROUND OF THE INVENTION

The present invention relates to an information processing system, apparatus, method, and storage medium for providing information via a network.

The assignee of the present invention has been proposed several systems in which data of a sensed image is provided from a camera server to a client via a general purpose network, such as the Internet, and displayed, and several apparatuses used in those systems.

Among those proposals, there is one in which a pan angle, a tilt angle, and a zoom ratio of a camera, connected to a server on a network, are allowed to be controlled by a remote client and an image sensed under the above control is transferred to the client via the network.

Further, there is an application called push-media. This is a technique of updating information in a server and transferring the updated information to a client. In the push-media, transference of information is performed by "pushing" image data to a user without the user being aware, and the user is able to always have the latest information without a wait. As for a system of this type, there is Castanet, available from Marbimba Inc., using the hyper text transfer protocol (HTTP).

The World Wide Web (WWW) system, which is the most popular system, at present, is realized using the HTTP. The HTTP operates in the following manner.

1) A client transmits a request to a server.
2) The server returns a response to the client.

In other words, a WWW browser, which is a client, transmits a request to a server, and the server returns a response to the request.

If push-media is provided, image information in a server can automatically be provided to a client using the HTTP. When the push-media is used, it looks as if various information is automatically transferred to a client (browser). However, regardless of how the transference of information looks to a user, the information is not independently transferred from the server; actually, the browser periodically sends inquiry to the server and the information is returned from the server in response to the inquiry by the browser. More specifically, the browser periodically transmits inquiry to the server, and only when it is confirmed that information has been updated in the server, then the browser obtains the information from the server. Therefore, when the information is updated in the server, the client does not know of it without delay. A procedure for sending a request from the client to the server is necessary, thus, the time for the procedure cannot be omitted.

Further, it is possible to notifying a client of an occurred change in state on the side of a server without delay by performing a process of monitoring a change in state in the server and a process of receiving information on the change in the state by the client, and communicating between the server and the client using Transmission Control Protocol and Internet Protocol (TCP/IP). In this method, a protocol other than HTTP may be used, however, when a firewall exists, the method using TCP/IP does not work.

By comparison, HTTP is widely used, and it is possible to get over the firewall in most sites using HTTP. Therefore, it is desirable that a change in the state of the server be notified, from the server to the client, using HTTP.

Accordingly, a structure to immediately notify a change in state of the server to a client using HTTP is demanded.

SUMMARY OF THE INVENTION

The present invention has been made in consideration of the above situation, and has as its object to provide an information processing system, apparatus, method, and recording medium capable of enabling to a reduction in traffic of a network by omitting the transmission of information when the information has not changed.

It is another object of the present invention to provide an information processing system, apparatus, method, and recording medium capable of overcoming the aforesaid problems by getting over the firewall.

According to the present invention, the foregoing object is attained by providing an information processing system including a server and a client connected to a network, wherein the server comprises: monitoring means for monitoring an occurrence of an event in information to be provided; and informing means for informing the client of information corresponding to the event on the basis of the monitoring by the monitoring means, and the client comprises: reception means for receiving notification from the informing means and performing processing on the basis of the contents of the notification.

Other features and advantages of the present invention will be apparent from the following description taken in conjunction with the accompanying drawings in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

FIG. 4 is a flowchart for explaining an operational sequence of an applet according to the embodiment; and FIG. 5 is a view showing an example of a user interface of the applet.

DETAILED DESCRIPTION OF THE PREFERRED EMBODIMENT

A preferred embodiment of the present invention will be described in detail in accordance with the accompanying drawings.

Figure 1:
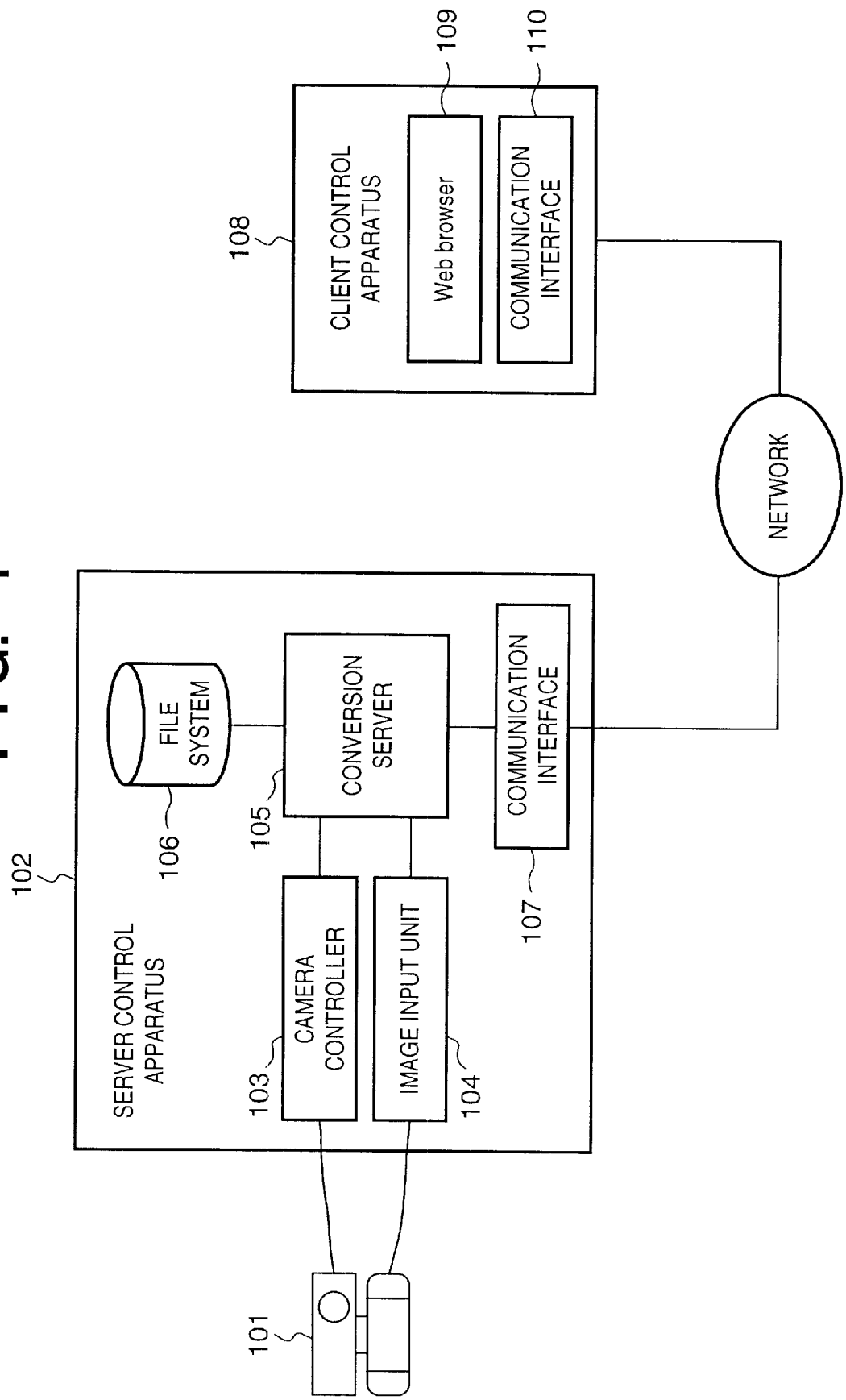
FIG. 1 is a block diagram illustrating a configuration of a system for explaining an embodiment.

FIG. 1 is a block diagram illustrating a configuration of a system according to the embodiment. In FIG. 1, reference numeral 102 denotes a server control apparatus (referred to as "camera server" hereinafter) for providing information. In the embodiment, the system includes a camera 101, and the camera server 102 transmits an image sensed by the camera 101 to a client control apparatus. Reference numeral 108 denotes a client control apparatus (simply referred to as "client" hereinafter).

In FIG. 1, a single camera server and a single client are shown, however, a plurality of cameras and clients may be connected to a network.

Both the camera server 102 and the client 108 are realized by personal computers, for instance, and their functional configurations are as follows.

Reference numeral 101 denotes the camera whose view and image sensing conditions (e.g., pan angle, tilt angle, and zoom ratio) can be controlled (to control the pan angle and the tilt angle, a pan head (not shown) is controlled). Reference numeral 103 denotes a camera controller for controlling the angle of the camera 101 and receiving a condition of the camera 101. Communication between the camera 101 and the camera controller 103 is performed using RS232c interfaces, and associated software. Reference numeral 104 denotes an image input unit for capturing an image from the camera 101, and it is configured with a video capture card installed in an expansion bus, which a personal computer is usually equipped with.

Reference numeral 105 denotes a conversion server which converts information received from a client in HTTP, for instance, into instruction information for the camera controller 103 and transmits image data (video data) sensed by the camera 101 and inputted via the image input unit 104 to a client in HTTP; 106, a file system for storing various kinds of information; and 107, a communication interface, such as a network adapter, for interchanging information with other apparatuses. As for the communication interface, Ethernet interface, and MODEM and terminal adapter (TA) for communicating on a network via line may be used. In addition to these resources, the server has a CPU, a storage apparatus, and a supplemental storage apparatus, which are usually provided to a personal computer.

The client 108 is an apparatus for obtaining image information and camera information from the camera server 102, and displaying proper information depending upon an instruction input by a user. The client 108 is realized using a personal computer, for instance.

The client 108 displays information (image data) obtained from the camera server 102 via a network, and has a Web browser (simply called "browser" hereinafter) 109 for executing an applet program sent from the camera server 102 and a communication interface 110, such as a network adapter, for interchanging information with other apparatuses. In addition to the above, the client 108 has a CPU, RAM, and a harddisk, for instance, which are usually provided to an ordinary personal computer.

Figure 2:
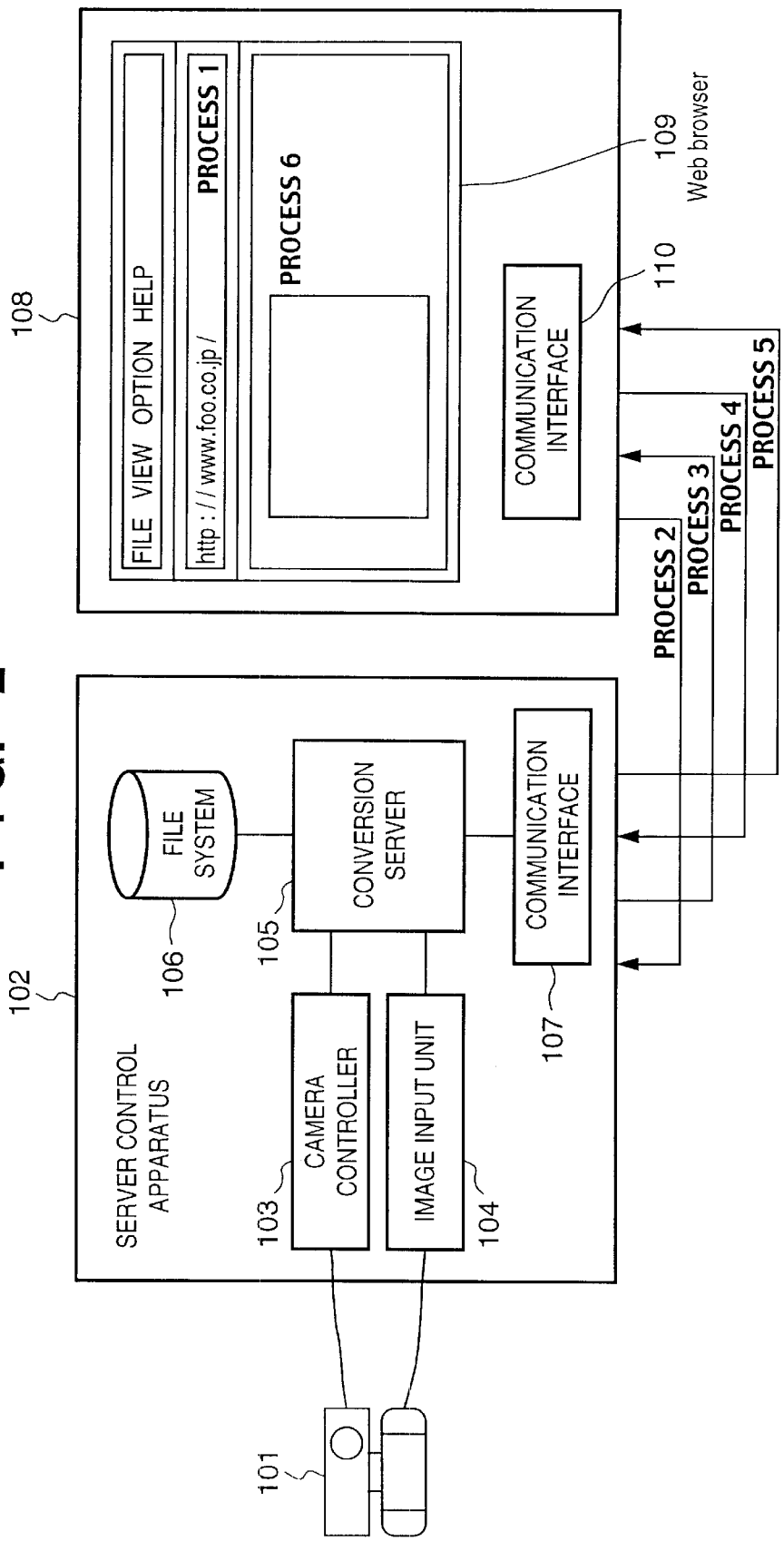
FIG. 2 is an explanatory view for explaining a brief operational sequence of the embodiment.

A brief operation of the system having the above configuration will be explained below with reference to FIG. 2.

Process 1: First, a user (an operator of the client 108) launches the Web browser 109 in his/her own terminal. Then, the user inputs description as shown below, and refers to a home page of a host which includes the camera server 102. Let the Uniform Resource Locators (URL) of the camera server 102 be www.foo.co.jp/, then, the user enters, http://www.foo.co.jp/

Process 2: The client 108 connects to the conversion server 105 via communication interfaces 110 and 107 using the Web browser 109. Then, it requests the conversion server 105 to send information back to the client 108 using the HTTP.

Process 3: The conversion server 105 fetches information from the file system 106 in response to the request from the browser 105, and transmits text information as follows.

<HTML>
<HEAD>
<TITLE>home page of www.foo.co.jp</TITLE>
</HEAD>
<BODY>
Welcome to www.foo.co.jp
<applet code=webview width=400 height=300></applet>
</BODY>
</HTML>

Process 4: The above text information includes <applet>tag. This tag means "execute and display applet at this position". Accordingly, the Web browser 109 reconnects to the conversion server 105, and requests to send an applet whose name is "webview".

The "applet" is a program written in an intermediate codes generated by a java compiler. The applet is stored in the file system 106 of the camera server 102. A browser conforming to java can execute an applet, loaded down from the server, within the browser.

The applet stored in the file system 106 in the camera server 102 is platform-independent, namely, it does not depend on an operating system. Therefore, the applet can run on a variety of platforms.

Process 5: The conversion server 105 sends the designated applet to the Web browser 109.

Process 6: The Web browser 109 executes the applet.

Figure 3:
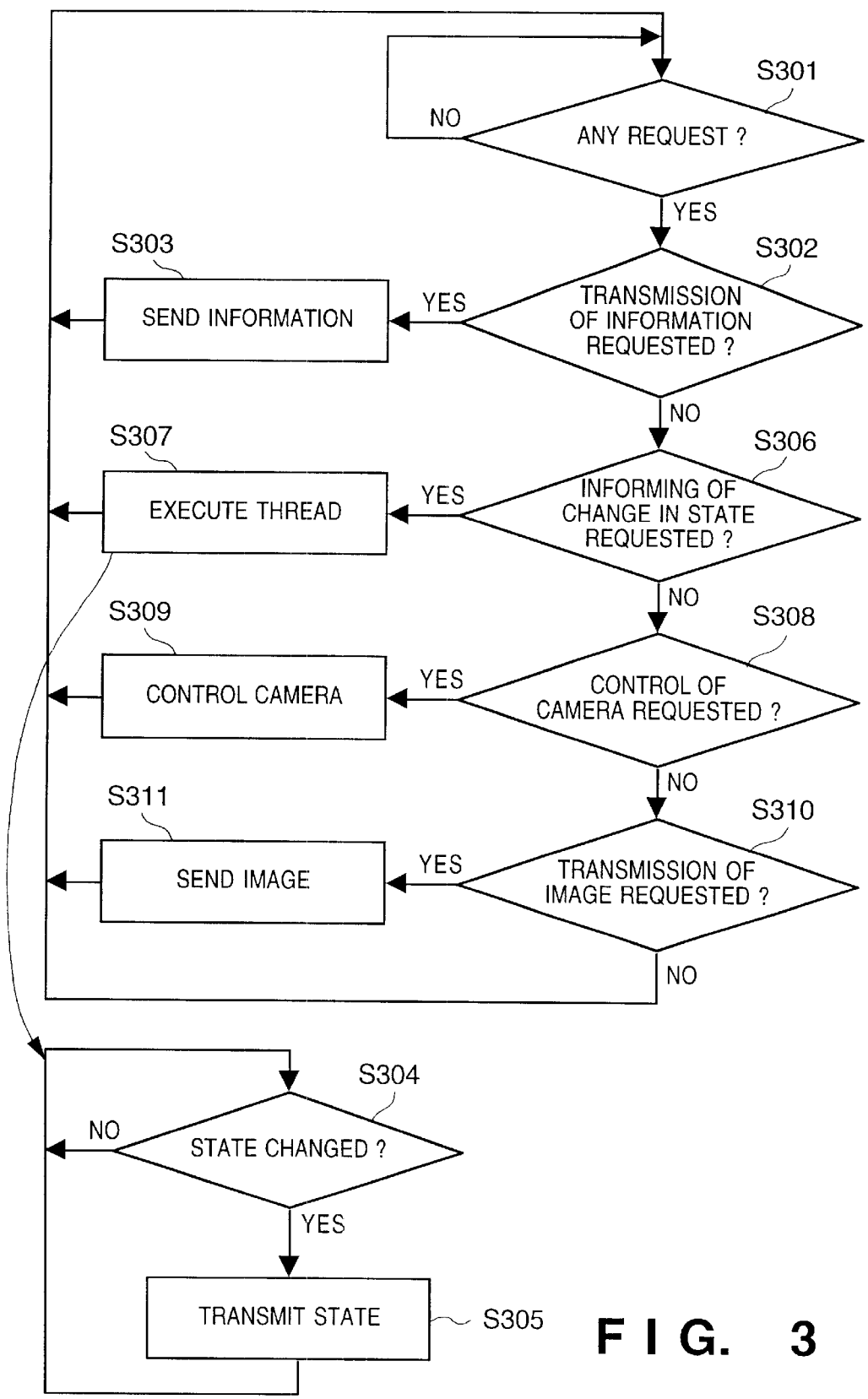
FIG. 3 is a flowchart for explaining an operational sequence of a conversion server 105 according to the embodiment.

Next, an operational sequence of the conversion server 105 in the camera server 102 is explained below with reference to FIG. 3.

First, in step S301, the process waits until a request is received from the client 108, and when a request is received, the process proceeds to step S302. If the request from the client 108 is a request to send page information or an applet, the process proceeds to step S303, whereas if it is not, the process proceeds to step S306.

The request from the client is transmitted using HTTP. An example of a character string transmitted is shown below.

To obtain page: GET /index.html HTTP/1.0

To obtain applet: GET /java/Webview.class HTTP/1.0

In step S303, the conversion server 105 transmits information in response to the request from the client 108, and the process returns to step S301 thereafter.

In step S306, whether or not the request from the client 108 is to inform a change in the state of the camera 101 is determined. If it is, the process proceeds to step S307, whereas if it is not, the process proceeds to step S308.

In step S307, a thread for monitoring the state of the camera and informing the client 108 of a change in the state, if any, is executed. Then the process returns to step S301.

By executing the thread, determination processing of determining whether or not any change in the state (in the embodiment, at least a change in pan angle, a change in tilt angle, or a change in zoom ratio) has occurred starts in step S304. While monitoring the state, the client 108 waits for information from the conversion server 105. A notice of change in state is informed by the camera controller 103 to the client 108 when a parameter, such as an angle and a zoom ratio of the camera, is updated. Note, information to be informed includes information indicative of whether or not a client is authorized to control the camera 101 (authorization to control). Detail of the information to be informed will be explained later.

When a change in the state occurs, the thread causes the process to proceed to step S305. In step S305, the changed state of the camera 101 is informed to the client 108. The following is an example of the contents transmitted.

pan=140
tilt=−50
zoom=580

As described above, when the state of the camera 101 connected to the server 102 changes, the contents of the change are informed to the client 108, immediately.

In step S308, whether or not a request by the client 108 to control the camera 101 is determined. If it is, the process proceeds to step S309, whereas if it is not, the process proceeds to step S310.

In step S309, the conversion server 105 requests the camera controller 103 to control the camera 101 using a camera control protocol. Regarding the camera control protocol, one proposed by the assignee of the present invention is adopted. After controlling the camera as described above, the process returns to step S301.

In step S310, whether or not the request from the client 108 is to transmit an image is determined. If it is, the process proceeds to step S311, whereas if it is not, the process returns to step S301.

In step S311, image information is obtained from the image input unit 104 using an image transfer protocol. Then, the obtained image is transferred to the client 108. The communication with the image input unit 104 is performed using the image transfer protocol. Regarding the image transfer protocol, one proposed by the assignee of the present invention is adopted. The contents of the image transfer protocol does not relate to the present invention; therefore, the explanation of it is omitted. After the process of step S311, the process returns to step S301.

Next, an operational sequence of the applet executed in the Web browser 109 in the client 108 is explained below with reference to FIG. 4. Until the client 108 connects to the camera server 102, a known browser may be used to display a home page of the camera server 102.

An example of a user interface of the applet is shown in FIG. 5. In FIG. 5, reference numeral 501 denotes the moving image display area; 502, a slider bar for controlling panning of the camera 101; 503, a slider bar for controlling tilting of the camera 101; and 504, a slider bar for controlling the zoom ratio of the camera 101. The control using the slider bars 502 to 504 is performed by, e.g., placing and clicking a pointer at the end of each slider bar or by dragging scroll boxes 502a to 504a of the slider bars 502 to 504, respectively, using a pointing device, such as a mouse. In other words, the positions of the scroll boxes 502a to 504a indicate current pan angle, tilt angle, and zoom ratio of the camera 101.

Note, the number of client allowed to connect to a single camera server 102 is not limited to one, and a plurality of clients may be connected. Therefore, only one client is authorized to change the angle and zoom ratio of a camera, namely, to control the slider bars. Many methods for authorizing a client to control the camera may be considered; here, the camera server 102 issues authorization for camera control to clients for a predetermined period of time, in turn, in the order of time when the client connected to the camera server 102. However, the present invention is not limited to this method of issuing authorization.

In step S401, three threads, namely, a user input processing thread, a state change processing thread, and an image display thread are executed.

The user input processing thread starts at step S402, the state change processing thread starts at step S407, and the image display thread starts at step S410, independently of each other.

In the user input processing thread, the process waits at step S402 until an input by a user is detected.

When an input by the user is detected, then the process proceeds to step S403, where whether or not the input is a request to terminate the threads is determined. If it is, the process proceeds to step S406 and all the threads are terminated and the processing is completed. Whereas, if it is not, the process proceeds to step S404.

In step S404, whether or not the user input is a request to control the camera. If it is, the process proceeds to step S405, whereas, if it is not, the process returns to step S402.

In step S405, the contents of the user operation performed by using the slider bars, as shown in FIG. 5, and a pointing device, such as a mouse, are transmitted to the camera server 102 as a request for controlling camera. The communication with the camera server 102 is performed in HTTP. An example of a control message is shown below.

GET /OperateCamera?PAN350 HTTP/1.0

Next, the state change processing thread is explained.

First, in step S407, a request that the camera server 102 notify the client 108 of a change in the state of the camera 101 when it occurs is transmitted to the camera server 102. It should be noted that the request in the embodiment is for directing the camera server 102 to notify the client 108 of image sensing conditions in a case where there is a change in the image sensing conditions of the camera 101 (e.g., at least one out of a pan angle, a tilt angle, a zoom ratio, a movement of an object, and an exposure condition), and the camera server 102 does not inform the client of the image sensing condition when there is no change in the image sensing conditions. Note, as an example of the content of the request in the embodiment, the following message is transmitted.

GET /GetNotice HTTP/1.0

In step S408, the process waits until a response from the camera server 102 is received. Information transmitted from the camera server 102 is the same as that shown in step S305.

When a response from the camera server 102 is received (angle information, for instance of the camera 101 is added to the response), the process proceeds to step S409, where the user interface is updated on the basis of the content received in step S408. More specifically, the positions of the scroll boxes of the slider bars 502, 503 and 504 are updated. By operating as above, when the angle and/or the zoom ratio of the camera is changed, the change is swiftly reflected on the user interface. Note, information indicating whether or not a client is authorized to control the camera is added to the response by the camera server 102, and if the information indicates that the client is not authorized to control the camera, then the scroll boxes 502a to 504a of the slider bars 502 to 504 are displayed in, e.g., a pale color so as to show that they can not be changed. Whereas, if the client is authorized to control the camera, the scroll boxes are displayed in a normal color to show that they can be changed.

Next, the image display thread is explained. The thread starts at step S410.

In step S410, a request for an image is sent to the camera server 102. An example of the message is as shown below.

GET /LiveImage HTTP/1.0

In step S411, image information transmitted from the camera server 102 is received. The image information is identical to that transmitted from the camera server 102 in step S311.

In step S412, data received in step S411 is displayed in the moving image display area 501. Thereafter, the process returns to step S410.

According to the embodiment as described above, whenever image data is received, the displayed content in the moving image display area 501 is updated; therefore, the displayed image looks a moving image. In contrast, as for positions of the scroll boxes 502a to 504a of the slider bars 502 to 504 for controlling a pan angle, tilt angle, and zoom ratio, respectively, information on a pan angle, tilt angle, and zoom ratio is transmitted from the camera server 102 to the client when a change in the state of the camera 101 occurs. Accordingly, the client 108 does not need to request the camera server 102 to inform the client 108 of the current state of the camera so as to update the positions of the scroll boxes, regardless of change in state of the camera. Further, the camera server 102 informs, the client, that there is a change in the state of the camera only when a change occurs; therefore, the traffic of a network is reduced.

Note, although hardware for capturing an image sensed by the camera 101 needs to be provided to the camera server 102, and both the camera server 102 and the camera 101 need hardwares of network interface; however, a personal computer can be used to realize the camera server 102.

Therefore, the object of the present invention can also be achieved by providing a storage medium storing program codes for performing the aforesaid processes by a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

Further, a change in the angle of a camera, especially a pan angle, tilt angle, and zoom ratio, is detected as an event; however, the present invention is not limited to these types of event, and a change in other operation, such as whether or not a backlight correction is performed, may be detected as an event.

According to the embodiment as described above, it is possible for a client to swiftly detect a change at a remote place. When detecting the change, HTTP is used for communicating between the server and the client; therefore, the above operation is executed even if there is a firewall between the server and the client.

In the embodiment, the angle and zoom ratio of the camera are considered as a change in the state, on the side of the server, at a remote position. However, the present invention is not limited to a camera, and any image input means, such as a scanner, may be used instead of a camera. Further, the present invention is not limited to transmission of a change in the state of a camera, and applicable to transmission of information of any type as far as the information changes non-periodically (i.e., at an irregular interval).

The following information may be considered as subject to transmission, for instance.

i) Stock information; when the stock information in a server is requested to be updated whenever it is changed.

ii) Image; when an image sensed by a camera is changed suddenly (i.e., when an intruder is detected).

Further, the present invention is not limited by the type of network, and applicable to any network, such as Internet.

According to the present invention as described above, no information is provided when there is no change in the information, thus, it is possible to reduce the traffic on a network.

Further, by providing information using HTTP, it is possible to provide information over a firewall.

The present invention is not limited to the above embodiment and various changes and modifications can be made within the spirit and scope of the present invention. Therefore to appraise the public of the scope of the present invention, the following claims are made.

What is claimed is:

1. An information processing system having a server connected to a network and a plurality of clients connected to the network,
wherein said server comprises:
receiving means for receiving information for controlling the server from one client of the plurality of clients which is authorized to control the server, and
informing means for informing the plurality of clients of information including status information of The server changed by processing in response to information received by said receiving means, said status information to be informed to the client authorized to control the server is different from status information to be informed to the other clients, and
wherein each of said plurality of clients comprises:
reception means for receiving information from said informing means of the server and performing processing on the basis of the status information included in the received information.

2. The information processing system of claim 1, wherein, the one client requests said server to transmit a predetermined file using hypertext transfer protocol, in response to the request, said server transmits a file including a description for receiving and executing an applet for performing automatic reception of a file.

3. The information processing system of claim 2, wherein said reception means of the one client is configured with said applet.

4. The information processing system according to claim 2, wherein said applet comprises means for displaying a state of an angle of the image transmitted from said server in a form of a slide bar.

5. The information processing system according to claim 1, wherein image input means whose input condition can be changed is connected to said server, and said monitoring means monitors an event of a change in the input condition of said image input means.

6. The information processing system according to claim 1, wherein a camera whose image sensing angle can be controlled is connected to said server, and said monitoring means monitors an event of a change in angle of said camera.

7. The system according to claim 1, wherein said status information includes information indicative of whether or not the client is authorized to control the server.

8. An information processing apparatus for providing information to a plurality of clients on a network, said apparatus comprising:

receiving means for receiving information for controlling a server from one client of the plurality of clients which is authorized to control the server; and informing means for informing the plurality of clients of information including status information of the server changed by processing in response to information received by said receiving means, said status information to be informed to the one client authorized to control the server is different from status information to be informed to the other clients.

9. A control method for controlling an information processing apparatus for providing information to a plurality of clients on a network, said method comprising:

a receiving step of receiving information for controlling a server from one client of the plurality of clients which is authorized to control the server; and an informing step of informing The plurality of clients of information including status information of the server changed by processing in response to information received in said receiving step, said status information to be informed to the one client authorized to control the server is different from status information to be informed to the other clients.

10. A computer program product comprising a computer usable medium having computer readable program code means embodied in said medium for realizing functions of an information processing apparatus for providing information to a plurality of clients on a network, said product including:

first computer readable program code means for receiving information for controlling a server from one client of the plurality of clients which is authorized to control the server; and second computer readable program code means for informing the plurality of clients of information including status information of a server changed by processing in response to information received by said first computer readable program code means, said status information to be informed to the one client authorized to control the server is different from status information to be informed to the other clients.

11. A client capable of communicating with a server, said client comprising:

reception means for receiving information including status information of the server for the server; and processing means for processing on the basis of status information included in information received by said reception means, wherein the server receives information for controlling the server from one client of a plurality of clients which is authorized to control the server and informs the plurality of clients of information including status information of the server changed by processing in response to received information, said status information to be informed to the one client authorized to control the server being different from status information to be informed to the other clients.

12. The client according to claim 11, wherein said server transmits a file including a description for receiving and executing an applet for performing automatic reception of a file.

13. The client according to claim 12, wherein said applet comprises means for displaying a state of an angle of the image transmitted from said server in a form of a slide bar.

14. The client according to claim 11, wherein said reception means is configured with said applet.

15. The client according to claim 11, wherein image input means whose input condition can be changed is connected to said server, and said server monitors an event of a change in the input condition of said image input means.

16. The client according to claim 11, wherein a camera whose image sensing angle can be controlled is connected to said server, and said server monitors an event of a change in angle of said camera.

17. A control method for controlling a client capable of communicating with a server, said method comprising:

a reception step of receiving information including status information of the server for the server; and a processing step for processing on the basis of status information included in information received in said reception step, wherein the server receives information for controlling the server from one client of a plurality of clients which is authorized to control the server and informs the plurality of clients of information including status information of the server changed by processing in response to received information, said status information to be informed to the one client authorized to control the server being different from status information to be informed to the other clients.

18. A computer program product comprising a computer usable medium having computer readable program code means embodied in said medium for realizing functions of a client capable of communicating with a server, said product including:

first computer readable program code means for receiving information including status information of the server for the server; and second computer readable program code means for processing on the basis of status information included in information received by said first computer readable program code means, wherein the server receives information for controlling the server from one client of a plurality of clients which is authorized to control The server and informs the plurality of clients of information including status information of the server changed by processing in response to received information, said status information to be informed to the one client authorized to control The server being different from status information to be informed to the other clients.

* * * * *

UNITED STATES PATENT AND TRADEMARK OFFICE
CERTIFICATE OF CORRECTION

PATENT NO. : 6,473,796 B2
DATED : October 29, 2002
INVENTOR(S) : Kenichiro Tanaka It is certified that error appears in the above-identified patent and that said Letters Patent is hereby corrected as shown below:

<u>Title page,</u>
Item [56], References Cited, OTHER PUBLICATIONS, please insert -- video -- after "anatomizing."

Signed and Sealed this

Third Day of June, 2003

JAMES E. ROGAN
*Director of the United States Patent and Trademark Office*